United States Patent [19]

Anichini

[11] 3,803,475

[45] Apr. 9, 1974

[54] AUTOMATIC DEVICE FOR CONTROLLING THE DISCHARGE OF A BATTERY

[75] Inventor: Cesare Anichini, Firenze, Italy

[73] Assignee: Finike Italiana Marposs, Soc. in Accomandita Semplice di Mario Possati & Co., Bologna, Italy

[22] Filed: Apr. 10, 1972

[21] Appl. No.: 242,403

[30] Foreign Application Priority Data
Apr. 14, 1971   Italy.................................... 3399/71

[52] U.S. Cl...................... 320/13, 307/116, 320/54, 331/181
[51] Int. Cl........................ H01h 36/00, H03b 5/00
[58] Field of Search........ 320/13, 54; 307/116, 119, 307/120, 125; 331/112, 146, 151, 185, 181; 323/51; 340/195, 199

[56] References Cited
UNITED STATES PATENTS

| | | | |
|---|---|---|---|
| 3,707,686 | 12/1972 | Uekusa et al................... | 331/181 X |
| 3,176,241 | 3/1965 | Hogan et al...................... | 323/51 X |
| 3,555,405 | 1/1971 | Martin........................... | 340/199 X |
| 2,584,728 | 2/1952 | Michel........................... | 331/185 X |
| 2,884,518 | 4/1959 | O'Neill........................... | 320/54 X |
| 2,687,509 | 8/1954 | Lewis............................... | 320/54 X |

Primary Examiner—J. D. Miller
Assistant Examiner—Robert J. Hickey
Attorney, Agent, or Firm—Stevens, Davis, Miller & Mosher

[57]   ABSTRACT

A device for automatically controlling the discharge of a battery supplying an electronic apparatus which includes a transducer having an input circuit, an output circuit and a displaceable member. The device comprises an oscillator circuit which oscillates when the displaceable member is located within a predetermined position zone. When the oscillator circuit is oscillating, the impedance presented by the electronic apparatus to the battery is relatively low permitting normal power to be delivered to the apparatus. When the circuit is not oscillating, the impedance is relatively high and discharge of the battery is very slow with negligible consumption of energy.

8 Claims, 2 Drawing Figures

AUTOMATIC DEVICE FOR CONTROLLING THE DISCHARGE OF A BATTERY

BACKGROUND OF THE INVENTION

The present invention relates to a device for the automatic control of the discharge of a supply battery for a measurement apparatus.

Battery-fed measuring apparatus are known. In such apparatus, the battery is generally left permanently connected to a given load thereby placing a serious limitation on its life. The insertion of a switch does not completely solve the problem since, when the apparatus is used, the operator cannot be relied upon to turn the switch on and off continuously.

Furthermore, the introduction of a mechanical switch bound to the movement of the measurement member is not satisfactory. As a matter of fact, in view of the limited stroke of the measurement member, the positioning of the contacts of the switch is very difficult. Furthermore, the operation is often unreliable and untrustworthy due to the ease with which the contacts oxidize. Finally, the introduction of a mechanical contact directly coupled to the measurement member may change the balance of the system and affect the measurement.

SUMMARY OF THE INVENTION

The technical problem which the present invention proposes to solve is that of providing a device for controlling the discharge of a battery which automatically connects the battery when the apparatus is in operating condition and disconnects the battery when the apparatus is not being used to make a measurement.

The device in accordance with the present invention solves this problem, it being characterized by the fact that there is inserted in the measurement detection circuit an element which is variable as a function of the position of the measurement member, the element being of such a nature as to keep the battery connected in a substantially open circuit when the member is not in measuring position and to bring the circuit into operating condition when the member is in a measuring position.

DESCRIPTION OF THE PREFERRED EMBODIMENT

Figure 1:
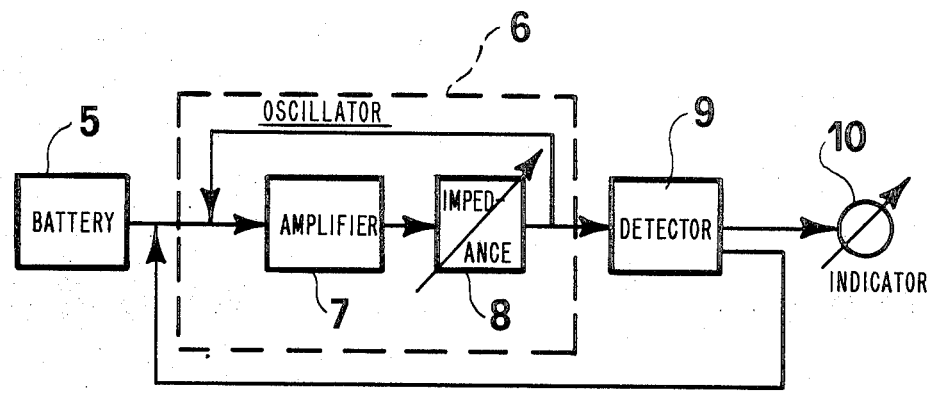
FIG. 1 is a block diagram of the device in accordance with the invention.

Referring to FIG. 1, 5 is a supply battery for a sinusoidal triggered oscillator 6. The oscillator 6 comprises an amplifier 7 and a variable impedance 8, the variations of impedance 8 being of such nature as to control whether or not oscillator 6 is in a triggered condition. The output of the oscillator is brought to a detector 9, the output of which in its turn controls an indicating instrument 10. This output is further brought to the input of the oscillator 6.

Impedance 8 is variable as a function of the value of the measurement of the part being measured. More in particular, in the absence of the part to be measured, the impedance of the unit 8 is such as to prevent the oscillator 6 from oscillating. Under this condition, the battery 5 is practically connected in an open circuit so that its discharge is very slow and its consumption not appreciable.

In the presence of the part to be measured, the impedance 8 is, however, brought to a value such as to permit the oscillator to oscillate. The oscillations are rectified by the detector 9 and sent as positive feedback, to the input of the oscillator 6. These oscillations are thus increased until the amplifier 7 is stabilized at the delivery of a given power. Under these conditions, the output of the oscillator 6 is able to control the indicating instrument 10 which supplies the indication of the value of the quantity being measured.

Thus, this device permits the battery 5 to discharge only when the apparatus is in operating condition.

Figure 2:
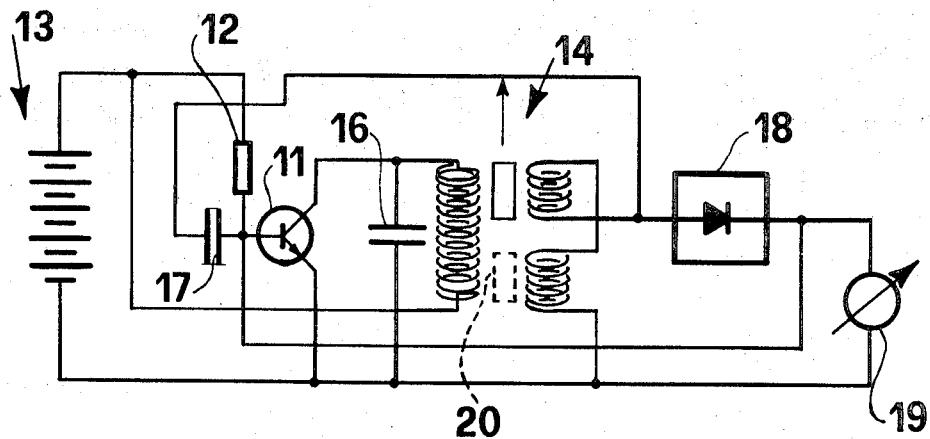
FIG. 2 is a preferred embodiment of the device of FIG. 1.

The device in accordance with the invention is described in further detail with reference to FIG. 2.

In this figure, 11 is a transistor of the NPN type fed at its base via a resistor 12 of very high value by a battery 13. At the collector of transistor 11 there is connected the primary of a transducer consisting of a differential transformer 14. The collector and the emitter of transistor 11 are furthermore connected by a capacitor 16 which determines the oscillation frequency.

The output of the secondary of the differential transformer 14 is brought, via a capacitor 17, to the base of the transistor 11 and furthermore to a detector 18 of a known type. The output of the detector 18 is coupled to a measuring instrument 19 and to the base of the transistor 11. The coupling between the primary and secondary of differential transformer 14 is effected by a ferromagnetic element 20 connected to the measurement feeler (not shown) and therefore movable as a function of the dimensions of the part which is to be measured.

The device operates in the following manner. The transistor 11 is connected so as to operate in an oscillator circuit. When the part to be measured is not in measuring position, the ferromagnetic element 20 is at the bottom (shown in dashed lines) and the value of the inductance in the collector-base circuit of transistor 11 due to the differential transformer 14 is such as to prevent the circuit from entering into oscillation.

Due to the high value of the resistance 12, the current flowing in the circuit is very low, substantially of the same order of magnitude as the dispersed current of the battery. The battery accordingly discharges only to an unappreciable extent.

When the part to be measured is brought into measurement position, the ferromagnetic element 20 is moved upward in the direction of the arrow to assume the position shown by the solid lines. The value of the inductance in the collector-base circuit of the transistor 11, due to the transformer 14, now becomes such as to permit the circuit to enter into oscillation. Due to small signal at the input of transistor 11, the oscillations are of greatly reduced magnitude. These oscillations are rectified by the detector 18 and coupled to the base of transistor 11 as a positive feedback. In this way the signal at the input of the transistor becomes larger and larger and there is an increase in the oscillations which are stabilized at a given amplitude. The characteristics of the oscillations at the output of the secondary of the transformer 14 depend in this way only on the position of the element 20, which is determined by the dimensions of the part being measured. The output of transformer 14, rectified by detector 18, controls the position of the pointer of the measuring instrument 19 which supplies the indication of the value of the measurement of the part.

Upon removing the part to be measured, the element 20 returns downward and brings the value of the inductance to a value such as to no longer permit the oscillator to oscillate. The system then reverts to the conditions initially described in which the battery 13 is connected in a very high impedance circuit so that its discharge is very slow.

Modifications can be made in the device described without going beyond the scope of the invention. In particular, the transducer may be of any type; the only condition to be respected is that the value of its impedance be such that, duly combined with the other parameters of the oscillator, it prevents the triggering of oscillations up to a certain position and permits the triggering beyond said position. In this way the oscillator and the other unit may be of any known type.

What is claimed is:

1. A device for automatically controlling the discharge of a battery comprising a differential transformer transducer having input and output coils electromagnetically coupled by a displaceable member consisting of a ferromagnetic element;
   an amplifying circuit coupling said input coil to said battery; and
   positive feedback means coupling the output coil of said transducer to the input of said amplifying circuit for controlling the triggering thereof, said positive feedback means and said displaceable member controlling the oscillation of said device and the discharge of said battery.

2. In a battery-fed apparatus for making measurements the combination comprising:
   a transducer having a displaceable member, the position of said member depending upon the quantity being measured;
   an amplifier coupling said battery to the input of said transducer;
   detecting means coupled to the output of said transducer;
   indicating means coupled to said detecting means for indicating the value of the quantity being measured; and
   positive feedback means coupling the output circuits of said transducer to the input of said amplifier, said positive feedback means causing the amplifier to oscillate and the apparatus take power from the battery when said displaceable member is in a position to make a measurement and to prevent the amplifier from oscillating and the apparatus taking power in the rest condition of said displaceable member, the output circuits of said transducer moreover driving through said detecting means said indicating instrument for providing indication of the measurement taken, said indication depending on the position of said displaceable member.

3. The apparatus as defined by claim 2 wherein the output of said detecting means is connected to the input of said amplifier circuit to provide positive feedback in the measuring condition of said displaceable member.

4. The apparatus as defined by claim 2, wherein said transducer comprises a differential transformer having input and output coils electromagnetically coupled by said displaceable member, said displaceable member consisting of a ferromagnetic element; and wherein said positive feedback means comprises a first circuit coupling an output coil of said transformer to the input of said amplifier.

5. The apparatus as defined by claim 4 wherein the output coils of said transducer are connected to said indicating means through said detecting means, and wherein said positive feedback means comprises a second circuit coupling the output of said detecting means to the input of said amplifier.

6. A device for automatically controlling the discharge of a battery for supplying an electronic apparatus, said electronic apparatus comprising a transducer having an input circuit, an output circuit and a displaceable member, the device comprising
   amplifying means having first, second and third terminals, the first and second terminals of said amplifying means being coupled across first and second terminals respectively of said battery,
   circuit means connected to the input circuit of said transducer, said transducer having an input coil, an output coil and a displaceable member electromagnetically coupling said input and output coils, said input coil being coupled between the third terminal of said amplifying device and the second terminal of said battery and said output coil being coupled between the first and second terminals of said amplifying means;
   detector means coupled between the output coil of said transducer means and an output indicating instrument, the output of said detector means being further coupled to the second terminal of said amplifying device, the impedance presented by said electronic apparatus to said battery being relatively high when said displaceable member is within a first position zone and relatively low when said displaceable member is within a second position zone.

7. A device as defined by claim 6 wherein said amplifying means comprises a transistor and wherein the first terminal of said amplifying means is connected to the emitter, the second terminal to the base and the third terminal to the collector of said transistor.

8. A device as defined by claim 6 which further comprises a resistor coupling the base of said transistor to the second terminal of said battery, a first capacitor coupling the base of said transistor to the output coil of said transducer means and a second capacitor coupled between the collector and emitter of said transistor.

* * * * *